United States Patent [19]
Head

[11] Patent Number: 5,626,312
[45] Date of Patent: May 6, 1997

[54] PIEZOELECTRIC ACTUATOR

[75] Inventor: Robert E. Head, Tempe, Ariz.

[73] Assignee: McDonnell Douglas Corporation, Huntington Beach, Calif.

[21] Appl. No.: 271,120

[22] Filed: Jul. 6, 1994

[51] Int. Cl.[6] .................................................. B64C 13/24
[52] U.S. Cl. ........................ 244/75 R; 244/214; 244/219; 244/11.25; 60/528; 310/328
[58] Field of Search ........................... 244/75 R, 213, 244/214, 215, 17.11, 17.13, 17.25; 60/528; 310/328, 333, 367, 330

[56] References Cited

U.S. PATENT DOCUMENTS

| | | | |
|---|---|---|---|
| 2,560,651 | 7/1951 | Kutzler | 60/528 |
| 2,625,997 | 1/1953 | Doak | 416/24 |
| 3,035,126 | 5/1962 | Crownover | 179/100.41 |
| 3,219,850 | 11/1965 | Langevin | 310/333 |
| 4,219,755 | 8/1980 | O'Neill et al. | 310/328 |
| 4,399,386 | 8/1983 | Osaka et al. | 310/328 |
| 4,435,667 | 3/1984 | Kolm et al. | 310/367 |
| 4,468,583 | 8/1984 | Mori | 310/328 |
| 4,519,743 | 5/1985 | Ham | 244/17.3 |
| 4,793,571 | 12/1988 | Kranz | 244/3.1 |
| 4,812,698 | 3/1989 | Chida et al. | 310/330 |
| 4,845,357 | 7/1989 | Brennan | 250/227.14 |
| 4,987,334 | 1/1991 | Jungwirth | 310/333 |
| 5,127,228 | 7/1992 | Swenson | 60/528 |
| 5,150,864 | 9/1992 | Roglin et al. | 244/75 R |

FOREIGN PATENT DOCUMENTS

| | | | |
|---|---|---|---|
| 0576648 | 10/1977 | U.S.S.R. | 310/328 |
| 2090214 | 7/1982 | United Kingdom | 416/24 |
| 2229789 | 10/1990 | United Kingdom | 310/328 |

*Primary Examiner*—Galen L. Barefoot
*Attorney, Agent, or Firm*—Ronald M. Goldman; Ronald L. Taylor

[57] ABSTRACT

A piezoelectric actuator includes a plurality of linearly axially expandable hard piezoelectric rods located between two plates and are distributed about a central twistable core fastened between the plates, with the axis of the rod skew to the axis of the core, resembling a squirrel cage. The actuator produces a twisting movement between the plates, responsive to voltage induced expansion of those piezoelectric rods. Fly by Wire aircraft control is realized with the actuator in various systems providing all electric control of aerodynamic surfaces, including an electronic helicopter swashplate by which the effective pitch of the main rotor blade is controlled.

15 Claims, 2 Drawing Sheets

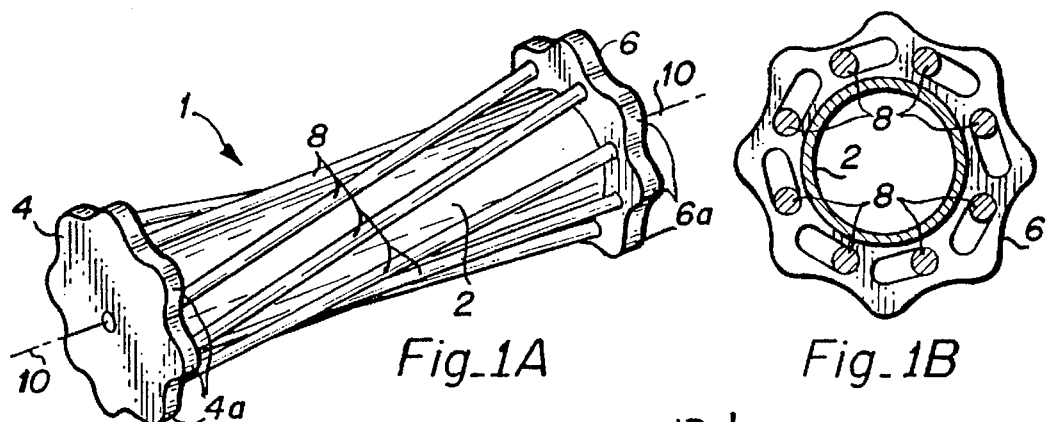
Fig_1A    Fig_1B
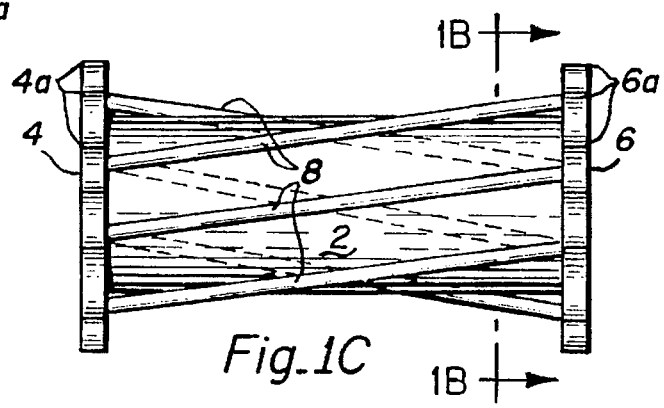
Fig_1C
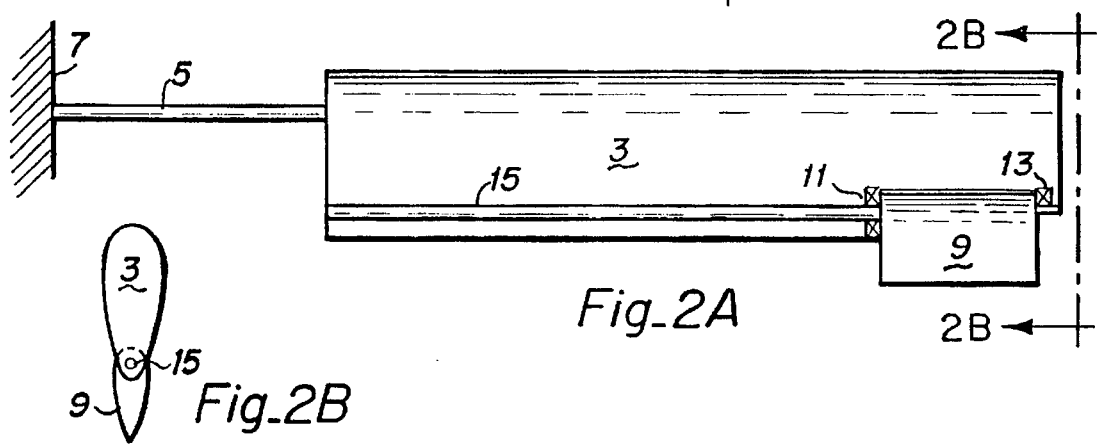
Fig_2A
Fig_2B
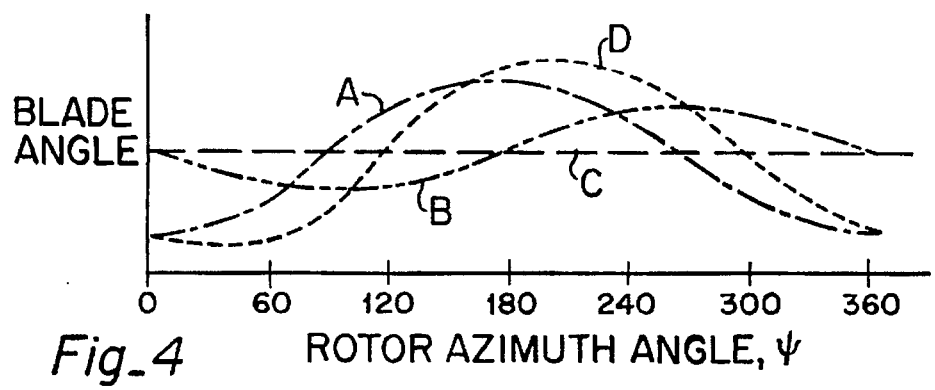
Fig_4    ROTOR AZIMUTH ANGLE, ψ

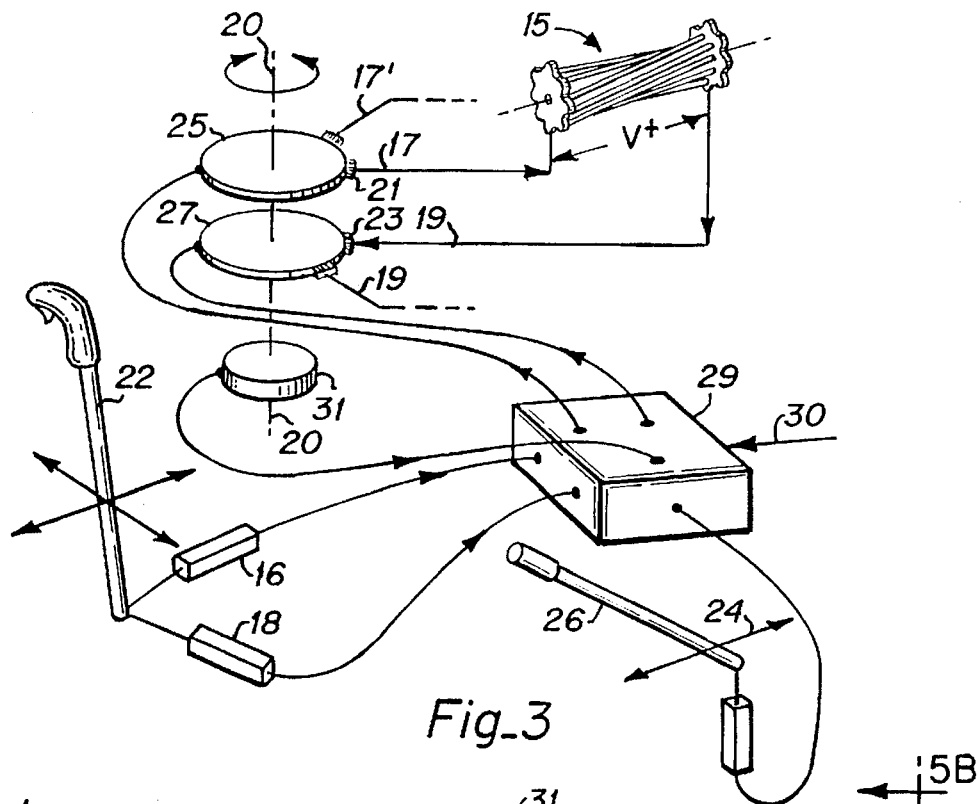
Fig_3
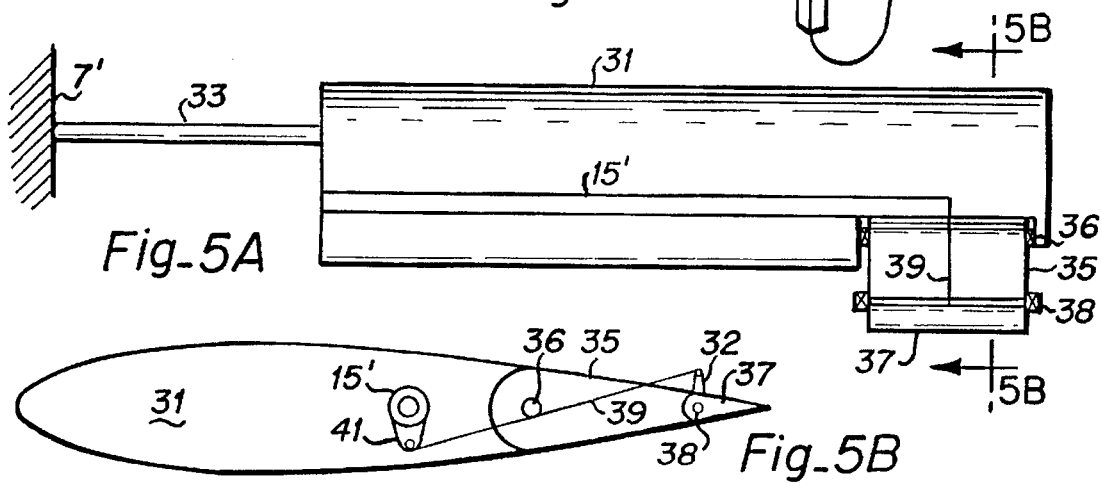
Fig_5A
Fig_5B
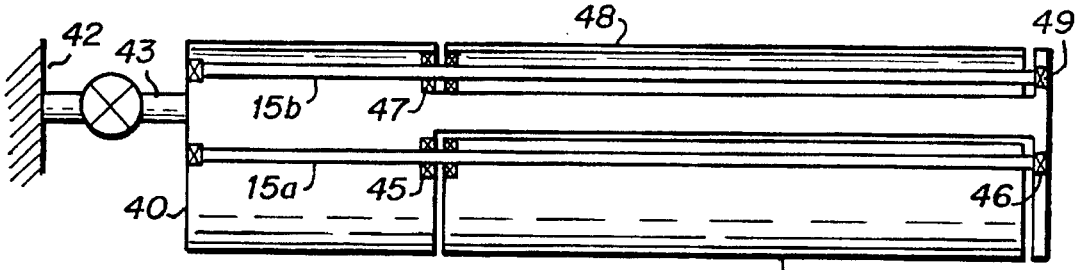
Fig_6A
Fig_6B

PIEZOELECTRIC ACTUATOR

FIELD OF THE INVENTION

This invention relates to piezoelectric transducers and, more particularly, to a piezoelectric actuators capable of directly producing mechanical torque. The invention also relates to control systems, including piezoelectric actuators, for positioning pivotably mounted members, such as those found in aircraft and, more particularly, to an electronic swashplate for helicopter rotors.

BACKGROUND

Electrical actuators that rely on the piezoelectric effect to produce movement in response to applied voltages are known and have found use in many different fields, including electrical switches and positioning devices. In U.S. Pat. No. 3,035,126, granted May 15, 1962 to J. W. Crownover, entitled Transducer, a piezoelectric transducer is described containing a piezoelectric formed in the shape of a hollow cylinder with the electrodes being formed as helical strips that wind about the axis of the cylinder. That transducer produces a twisting motion in response to application of a voltage to the electrodes as enables it to function as an actuator element of an electrical relay device. Conversely, when mechanically twisted the piezoelectric produces a voltage output on the electrodes generally in proportion to the amount of twist and is used as a phonograph needle cartridge.

It is appreciated that the amount of torque required for the relay application of Crownover patent is small. Such prior piezoelectric actuators are not known to be used to directly control aircraft wing flap position or, particularly, helicopter rotor blades, where significant torque is required to pivot an airfoil surface or the like and maintain the surface in the pivoted position. As an advantage, the present piezoelectric actuator may be used in aircraft air foil surface control. The piezoelectric actuator of the invention permits control of a helicopter rotor blade pitch and may be carried on and/or rotated with the helicopter's rotor blade.

Accordingly, an object of the invention is to provide a piezoelectric actuator capable of producing large torque.

An additional object of the invention is to provide a novel electrically operated rotary actuator of novel construction that produces a rotational movement responsive to application of electrical voltage.

A further object of the invention is to provide a new and effective piezoelectric type actuator of simple construction, that may be rotated with and control the pitch of a helicopter rotor blade.

In rotary wing aircraft the conventional means for controlling the craft is by means of a mechanical pushrod bellcrank system that transmits the pilot's inputs to pitch angle of the main rotor blades. For all except the very smallest helicopters, a hydralic boost system is incorporated to aid the pilot. An integral part of the control system is a swashplate that conducts the control motions across the interface between the non-rotating fuselage and the rotating rotor. The swashplate rises and falls in response to the pilot's collective pitch stick to vary the total lift produced by the rotor and tilts as directed by the cyclic pitch stick to vary the pitch angle cyclically around the azimuth for contolling the helicopter's pitch and roll angles and, thereby, the helicopter's direction of flight.

Electrical "fly by wire" controls have heretofore been developed for fixed wing aircraft, both in military and commercial aircraft, to operate the flight control surfaces. In such systems, the control signals are transmitted along wires, eliminating the mechanical pushrods, bellcranks, and cables. The fly-by-wire, and the equivalent fly-by-light systems that transmits control signals by fiber optic means, affords considerable weight savings, especially for larger aircraft.

To date, such fly by wire technology has not been applied to rotorcraft, such as helicopters, because there has been no appropriate replication of the swashplate. Suitable power actuated devices, suitable for a fly by wire system for helicopter control, as could vary the blade pitch angles, until the present invention, were not available.

U.S. Pat. No. 4,519,743, granted May 28, 1985 to N. D. Ham, entitled Helicopter Individual Blade Control System describes a system for controlling the pitch angle of individual helicopter main rotor blades in which an accelerometer carried by the rotor blade provides sensor inputs to control circuits and an electrical servomotor drives the pitch change motions. Although providing additional electronic control, the Ham system, however, continues with the mechanical swashplate and is not a fly-by-wire system.

As an advantage, the present invention eliminates the complicated mechanical swashplate mechanism and replicates its function with a fly-by-wire control that allows simple slip rings to conduct control signals from an electronic controller across the fuselage rotor interface. Effectively the invention provides an electronic swashplate for helicopters.

A further object of the present invention, therefore, is to enable fly by wire control of helicopters.

An additional object of the invention is to provide a non-mechanical swashplate for controlling rotor blade pitch.

And a still additional object of the invention is to provide a helicopter rotor blade whose pitch may be directly controlled by an electrical actuator that is an integral part of the rotor blade assembly.

BRIEF SUMMARY OF THE INVENTION

Helicopter fly by wire control is accomplished with an electronic swashplate. The invention is characterized by a modified rotor blade structure and an electrical rotary actuator located in the blade, which responds to electrical control signals issued by power control circuits to directly control the blade pitch. The power control circuit translates the pilot's stick position and supplies the appropriate electrical voltages to the rotary actuator via a slip ring assembly, thereby effectively mimicing the functions of the mechanical swashplate mechanism used in prior helicopter designs.

Suitably the rotary actuator is a piezoelectric device. An ancillary invention encompasses a novel piezoelectric transducer, which serves to advantage in the foregoing combination as an electro-mechanical actuator that translates electrical voltage to a degree of angular rotation. In such device a thin walled cylindrical core, suitably formed of a large number of graphite filaments or strands packed together in parallel and bonded in a resin matrix, has a relatively fixed dimension in the axial direction and may be torsionally flexed about the core's axis. End plates are attached at each end of the core. The end plates contain peripheral portions extending radially outwardly, as spokes or spars, beyond the outer surface of the core. And a plurality of straight axially expandable piezoelectric rods are fixed between the two plates skewed to the core axis with such rods spaced from one another, equi-distant, about the core and in parallel, whereby, in appearance, forming a tilted cage for the cylindrical core. As viewed from an end of the actuator, the proximal end of each rod in the actuator is angularly spaced about the axis of the core from its corresponding distal end by a predetermined number of radians.

When an electrical voltage is applied across the ends of the rods in the foregoing structure, the rods expand. That expansion serves to turn or rotate one end support plate relative to the other, twisting the core in one direction of rotation. Contraction of the rods, responsive to withdrawal of current or application of current of opposite polarity, turns or rotates the end support plate and twists the core in the opposite direction.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the Drawings FIG. 1A is a perspective view of a novel piezoelectric rotary actuator; and FIGS. 1B and 1C are respective section and side views thereof;

FIGS. 2A and 2B pictorially illustrate in top elevation view and end view, respectively, a helicopter rotor blade constructed in accordance with the invention, that uses the piezoelectric actuator of FIG. 1;

FIG. 3 schematically illustrates the pilot's controls and associated electronic power control circuits used in conjunction with rotor blades constructed in accordance with the embodiment of FIGS. 42A and 2B and defines therewith an embodiment of the helicopter control system;

FIG. 4 is a graphical illustration of the blade angle as measured against the rotor azimuth angle that is required to create the lift of the rotor and tilt of the rotor plane to develop the force and moments need to maneuver the rotor in flight;

FIGS. 5A and 5B pictorially illustrate an alternative blade structure used in a second embodiment of the invention in which the blade is forced to maneuver aerodynamically under the influence of a small flap that is controlled by the actuator; and FIGS. 6A and 6B and pictorially illustrate an alternative blade structure used in another embodiment in which a fixed core supports a leading and a trailing edge flaps that are controlled by actuators.

DETAILED DESCRIPTION OF THE PREFERRED EMBODIMENTS

Reference is made to FIG. 1A, which illustrates in perspective the novel piezoelectric transducer 1, which desirably serves as rotary actuator, an important element, in the helicopter blade control invention later herein described. Concurrent reference is also made to FIGS. 1B and 1C, which illustrate the actuator in respective section and side views. The transducer contains a cylindrical core 2, which, preferably, is hollow and thin walled, a pair of end supports 4 and 6, suitably formed of an electrically conductive metal, each of which is permanently attached or bonded to core 2, and a plurality of straight rods 8, only one of which is numbered, formed of piezoelectric material.

As those skilled in the art appreciate, to produce mechanical motion, piezoelectric devices may be constructed in two different ways. The first consists of a series of stacked elements that produce a high axial force as the stack expands in the axial direction when voltage is applied, that is, a force directed along the axis of the stack, but very little motion. The other configuration is laminated like a bi-metallic strip and when voltage is applied, this configuration produces large bending motion, but very little force. This latter construction is often found in electrical switches in which the bi-metallic strip is held in cantilever fashion and the free end of the cantilever swings to an extent responsive to application of voltage, and attains another position to close an electrical connection. As is recognized, the actuator of the invention, uses the first described construction.

Each piezoelectric rod 8 is formed of a stack of small cylindrical piezoelectric elements that are laminated together coaxially to form an elongate rod like structure. The number of component elements forming the rod is a design factor that ultimately determines the length of the rod and the torque produced in operation by the actuator as described later herein in greater detail.

Core 2 is formed of a plurality of straight graphite fibers arranged and bonded in a resin matrix using conventional fabrication technique, commonly referred to as a composite graphite matrix. The matrix includes a minimal number of peripherially oriented graphite fibers to enhance structural stability. As a consequence the core is axially stiff, hence does not lengthen or elongate due to compressive or pulling forces, but is torsionally soft and, thus can be twisted through a predetermined arc. That characteristic of the core element is important to the assembled actuator as later herein discussed.

Each support plate contains spokes or spars that extend radially outwardly beyond the outer surface of core 2, such as spar 4a on plate 4 and spar 6a on plate 6. As shown the support plates are coaxially mounted to core 2 with the spars of each plate being in alignment with the spars on the other support plate. Each piezoelectric rod, 8, is firmly permanently bonded at an end to a spar of the left plate 4 and to a spar on the other support plate 6, specifically a spar that is angularly displaced one position from the spar that is in alignment with the spar on plate 4, and the rod is above and does not touch the outer surface of the core. As example, one end of piezoelectric rod 8 is connected to spar 4a; the other end is connected to spar 6b. Although a relative displacement of the rod ends of one position is used in the embodiment illustrated, as those skilled in the art appreciate, a different displacement may be used as appropriate in other embodiments, as example, two positions.

Thus with eight spars on each support plate as illustrated, evenly spaced about the axis of plate 4 by 45 degrees (Π/4 radians), and eight piezoelectric rods, when the right end of the piezoelectric rod is fastened to a spar on plate 4 that is located at 45 degrees, the left end of that rod is fastened to a spar on the other plate 6 that is located at 90 degrees. This creates an arrangement in which the rods are skew to axis 10 of the support plates and core 2, their individual axes of the rods do not intersect one another, and are parallel with one another. Overall the structure presents the appearance of a tilted squirrel cage in geometry.

Support plates 4 and 6 in this embodiment are electrically conductive as is the epoxy used to join the ends of rods 8 thereto. This places the left end of the rods in common electrically; and likewise places the right ends of the rods in common electrically thereby placing rods 8 in a parallel electrical circuit. It is understood that equivalent means may be substituted to place all the right and left rod ends, respectively, in common electrically in which instance the support plate need not be formed of electrically conductive material. As example, a conventional printed circuit technique may be used to produce electrical leads on the support plate that will tie the respective rod ends in common in electrical circuit.

By connecting a DC voltage across the support plates, through appropriate electrical leads, not illustrated, and hence across the ends of rods 8 in parallel circuit, the rods expand in length, and each rod creates both a force directed along axis 10 and a force orthogonal to axis 10. Since by design core 2 cannot increase in length, the axial force created simply stresses the core, whereas the orthogonal force, being applied to the support plate at some radial distance from axis 10, creates a torque or moment about the transducer's axis 10. The individual forces are uniformly distributed about the axis of the support plate, thereby avoiding creation of an assymetric force on the respective support plates. Since core 2 is torsionally flexible, support plate 6 is angularly rotated in one direction a predetermined amount relative to the other support plate, while core 2 twists.

By varying the level of applied voltage, the degree of torque created by the piezoelectric rods in the structure is accordingly varied; the higher the voltage, the greater the torque and the greater is the angular movement of the support plates. Thus electrical voltages applied to the rods are translated or transduced to a mechanical movement or displacement, hence the characterization of electrical to mechanical transducer.

As those skilled in the art of piezoelectric transducers recognize, the same structure also serves as a mechanical to electrical transducer. That is, by applying a torque on the support plates in a direction to compress the rods, as by holding plate 4 and turning plate 6 counterclockwise, due to the nature of the piezoelectric effect, a voltage is generated across the two electrically conductive support plates and the level of that generated voltage is to a degree proportional to the amount of applied torque. Inasmuch as the particular application for the described structure is as an electrical to mechanical transducer, as an rotary actuator, further applications are not here further explored.

With the foregoing structure and operation of the piezoelectric actuator being understood, consideration is next given to an embodiment of a helicopter fly by wire control system that advantageously employs the foregoing actuator to control the rotor blades. One may refer to existing helicopter technology and to the literature describing the details of construction of same as needed, including that for the SH-2 helicopter, marketed by Kaman Company of Connecticut. Those known construction details, though relevant to the application of the invention, need not be repeated herein. Since the present invention modifies only certain components of existing helicopter structure and, hence, the invention and its application to the existing helicopter structures, is more clearly illustrated and more easily understood from the drawing figures and description which follow, without the burden of repeating details already known to those skilled in the art.

Reference is next made to FIGS. 2A and 2B, illustrating an embodiment of the rotor blade according to the present invention. A blade 3 of a helicopter main rotor is pictorially illustrated in plan view and is attached to rotatable hub 7, symbolically illustrated, by a torsionally soft root end 5. The blade carries a trailing edge tab 9, located at the blade's trailing outer edge, with the tab pivotally mounted to the blade by bearings 11 and 13. An elongate rotary actuator 15 is also carried at the trailing edge of the blade. Preferably, actuator 15 is a piezoelectric actuator, such as the piezoelectric transducer 1, earlier illustrated and described and in which the piezoelectric material is "hard" piezoelectric. One end of the actuator is connected along the tab's pivot axis, defined by bearings 11 and 13, while the actuator's other end, to the left in FIG. 2A is rigidly fastened to the blade. As example the end plate 4 of the actuator may be rigidly attached to an L- bracket, not illustrated, and the other arm of the bracket may be welded to blade 3.

Blade 3 is much like the blades currently in use on the SH-2 model helicopter. As shown in the corresponding end elevation view of FIG. 2B, the blades front edge is rounded. With the actuator in normal quiescent or rest position as illustrated, tab 9 is profiled so that in appearance the blade overall resembles the profile of blades of prior construction, and, in the position illustrated, and does not produce any lift when rotated. As is apparent, operation of actuator 15, produces pivotal movement of blade tab 9 about the axis defined by the bearing. And as hub rotates to move the blade in a circular path, the actuator travels along. It is understood that the helicopter's main rotor contains at least two such blades connected to hub 7.

A pictorial illustration of the control system, as ensures one's understanding of the foregoing blade actuator control as part of a helicopter "fly by wire" control system, is presented in FIG. 3 to which reference is made. Electrical voltages are applied across rotary actuator 15 by leads 17 and 19, which in turn are connected by electrical brushes as forms part of a conventional electrical slip ring assembly structure, represented by brushes 21 and 23, and rings 25 and 27, fitted about the rotational axis 20 of the helicopter's hub and rotor. From the slip rings, thence, the circuits extend to the appropriate output terminals of the electronic mixer power control 29. The power control 29 receives inputs from the lateral resolver 16 and longitudinal resolvers 18, which translate the position of the pilots cyclic pitch stick 22 to corresponding electrical signals, from the collective resolver 24, that translates the position of the pilot's collective pitch stick 26 into corresponding electrical signals, and the rotor azimuth resolver, generally represented as 31, which translates the azimuthal position of the rotor to electrical signals representing the appropriate instantaneous angular position. An appropriate power source, not illustrated, either the battery or generator carried by the helicopter, supplies electrical power to the circuits in the power control unit via input 30.

The power control circuit incorporates any conventional electronic circuit that translates the inputted information into an appropriate voltage at the output. A large number of available circuits, the details of which are not necessary to an understanding of the invention, readily meet such a requirement are easily obtained in practice from circuit designers. As earlier discussed the particular level of voltages used in any practical embodiment of the invention depends upon fixing the variables involved in the actuator and blade tab and is essentially an engineering determination, once those design parameters are determined and selected. The foregoing are all conventional components found in helicopter designs with the exception of the power control output and, of course, the rotary actuator and modified rotor blades.

Responsive to the level of voltage and/or current applied to the actuator, the forward end of the actuator twists or turns through a prescribed angle, pivoting tab 9 accordingly, and holds at that angular position so long as the level of voltage and/or current is maintained. Should the voltage level be increased slightly, the tab is turned through an additional angular increment; should the level be decreased slightly, the tab is turned through an angular increment in the opposite direction. Effectively, the actuator controls the angular position of the tab, hence the lift and direction of travel for the helicopter, and the actuator in turn is controlled by the pilot's pitch sticks. As those skilled in the art appreciate, the exact amount of actuator rotation necessary is understood to depend upon many factors, depending upon the details of construction of the actuator and the kind and type of piezoelectric employed, which may be easily ascertained for each particular design and application.

The actuator is controlled to deflect the tab according to collective and cyclic pitch requirements. The deflected tab produces a pitching moment on the entire blade, which makes it "fly" into the desired feather angle position. The smart actuator inputs the conventional collective pitch and the first harmonic cyclic pitch for helicopter control. Additional higher harmonic pitch can be superimposed for minimizing rotor induced vibration and/or acoustic noise. The outboard end of the smart actuator and the tab are mounted on bearings.

It is readily apparent that an existing helicopter structure may be modified to incorporate the present invention.

In helicopter operation, the pilot operates the appropriate pitch stick and the position of that stick is translated by the power control circuit to the appropriate voltage that causes actuator 15 to angularly rotate tab 8 of each blade so that the driven rotor provides the appropriate degree of lift.

To direct the craft to move in a particular direction the cyclic pitch stick is moved in the desired direction. Power input control translates this into a suitable voltage that in level varies with the azimuthal position of the rotor blade and so tilts the rotor in the direction that the pilot desires for maneuvering.

The graph of FIG. 4 illustrates the change of blade angle as a function of the rotor azimuth angle for the lateral cyclic pitch, as represented in curve A, the longitudinal cyclic pitch as represented by curve B, and the collective pitch of the rotor as represented by curve C. When the collective pitch is raised, as indicated by curve C moving up, the blade angle is increased; resulting in greater lift on the helicopter. The cyclic pitch input is mixed through the controller and added to the collective pitch to produce the overall pitch angle around the azimuth as represented by curve D.

These are the blade pitch curves that would be produced by a mechanical swashplate and are identical to those that would be produced with the present invention.

The helicopter is controlled by electrical signals transmitted to the blade. With the collective and cyclic pitch commands introduced to the actuator and the actuator directly controlling the rotor blade pitch, the combination serves as a non-mechanical swashplate or, more specifically, as an electronic swashplate for the helicopter. Complicated hydraulic controls are eliminated. The mechanical swashplate mechanism is eliminated and replaced by an electronic swashplate with consequent weight savings.

In the embodiment of FIG. 2A, the trailing edge tab 9 acts as a conventional servo tab, known to those skilled in the art. With an appropriate electrical control signal applied to the actuator, the actuator twists and deflects servo tab 9. The servo tab imposes an aerodynamic moment onto the blade, causing the blade to twist its torsionally soft root end and thereby change its pitch angle to develop the desired airload.

An extension of the foregoing concept adds the aft servo tab illustrated in FIGS. 5A and 5B, which is a well known and well developed configuration for airplane control surface operation. Here piezoelectric actuator 15, mounted within the rotor blade, operates the servo tab through the "anti-balance" mechaism, comprising elements 32, 35, 39 and 41, that works in conjunction with main tab 35 that is pivotally mounted to the trailing edge of blade 31 by hinge 36 and the servo tab 39 that is hinged to the main tab by hinge 38. This configuration using the servo tab requires less control moment from the actuator as compared with the embodiment of FIG. 2A at the cost of a more complicated mechanism.

In each of these two configurations the strength of the electrical signal that varies with the azimuthal position of the blade controls the deflection of the actuator and, hence, the tab deflection and the blade pitch angle. It is anticipated that the available piezoelectric actuator strength is within present technology. It is recognized , however, that future aplications with increased loading may require either a greater number of piezoelectric rods in the actuator or development of improved piezoelectric materials with greater deflection versus voltage characteristics.

A helicopter rotor blade may contain more than one positionable control surface, such as is presented in the embodiment of FIGS. 6A and 6B, which is next considered. In FIG. 6A the elements are pictorially represented in top view with the outer upper skin of the blade removed. As in the prior embodiments a blade 40 is attached to rotatable hub 42 by root section 43. Blade 40 contains not only a positionable trailing edge flap 44, which is pivotally mounted on bearings 45 and 46, but a leading edge flap 48 as well. The leading edge flap is pivotally mounted on the main blade by bearings 47 and 49. Actuator 15a, as in the preceeding embodiment of FIG. 5 is fastened at one end to the main blade by a bracket or like mounting and its free end, which is angularly moves in operation, is connected to the trailing edge flap at a side and position thereon that is axially aligned with the pivot axis of the flap. Actuator 15b, the second actuator, is likewise attached to the blade at its left end in the figure and its movable end, at the right is connected to the leading edge flap at a side and position thereon that is axially aligned with the pivot axis of that flap.

Each actuator independently controls the angular position of its associated flap. The control circuit for this embodiment is the same as illustrated in FIG. 3, except it is enlarged to operate the leading edge flap as well as the trailing edge flap.

Although the described helicopter fly by wire control system embodiments incorporates a particular form of electrical rotary actuator, those skilled in the art recognize that electrical actuators of different construction as performs an equivalent function in the combination may be substituted, all of which fall within the scope of the present invention. Such alternative actuators should be small enough in size and weight to be carried by the rotor blade assembly, be capable of directly pivoting the rotor blade or flap in response to an applied voltage, and maintain the blade or flap position so long as the applied voltage remains, be rugged enough to withstand the centrifugal forces to which it is subjected since it is rotated by the hub as part of the rotor blades, and capable of withstanding the temperature range occurring at least in the ambient to which the particular helicopter is intended to be exposed in service.

From the foregoing description, some alternative actuator constructions come to mind. As example, in lieu of the cage of piezoelectric rods and spoked end plates used in the actuator embodiment of FIG. 1, spiral overwraps of piezoelectric material can be applied and permanently attached to the peripheral surface of core 2 that induces a twisting motion in the core when an electrical current is applied across the ends of the piezoelectric material. That twisting motion of the core's end can thus be harnessed like the construction of FIG. 1 to pivot a helicopter blade tab. Such an alternative appears less desirable since preliminary indications suggest that the bond between the piezoelectric wrap and the core cannot withstand the helicopter application. Until more reliable bonding techniques become available, piezoelectric actuators of that spiral wrap construction will not suffice in practical application in the described combination.

As further example, the actuator used in the foregoing embodiment of the helicopter control system as earlier described is constructed from hard piezoelectric as that material is relatively insensitive to the temperature effects in the range usually encountered in rotary wing aircraft. Soft piezoelectric material loses it piezoelectric properties at temperatures much over 100 degrees F and are thus more limited in aircraft application. Actuators employing soft piezoelectric materials would, thus, not be useful in aircraft control systems in rotary wing aircraft intended for operation in the hot regions of the world and, hence, are less preferable. Further, actuators can be formed of other materials that produce a change in dimension in response to voltage or other magnetic effect, such as magnetostrictive materials as example. Magnetostrictive materials, however appear less desirable as they have the same limitation to temperature as soft piezoelectric material as thus would be more limited in application.

It is also understood the invention is not limited to control systems that include electrical signal transmission; other equivalent forms may be substituted. As example, although the control system described in FIG. 3 employs electrical wires and slip rings to send electrical signals to the actuator, one is mindful of the equivalent means provided by fiber optics, optical type slip rings and optical or light wave signal transmission which are a known substitute for electrical signal transmission systems. Fiber optic transmission may be substituted for all or part of the electrical control system. As those skilled in the art further recognize, such optical systems may include electronic circuits and, in a sense, may be more aptly referred to as electro-optical systems. Thus the term "fly by wire" in the industry is intended to encompass in meaning "fly by light". And as the term electronic is herein used, it is understood that it encompasses within that term electro-optical and optical systems and/or circuits as well.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. As example, the foregoing specifically described rotor blade control for rotorcraft, but it is appreciated that the disclosed structure may be adapted to control surfaces on fixed wing aircraft as well. Thus the invention is to be broadly construed within the full scope of the appended claims.

What is claimed is:

1. An electromechanical transducer, comprising:
   a cylindrical shaped core, said core being torsionally flexible and longitudinally stiff, said core further defining an axis and having first and second ends;
   first and second end support plates fixed to the respective ends of said core, each said end plate including a peripheral portion extending radially outward beyond the outer surface of said core;
   a plurality of elongate rods of piezoelectric material, said plurality being equal to the integral number N, said rods being positioned about said core in non-intersecting relationship and skew to said core axis, with all of said rods being inclined at the same angle to said first support plate as measured in a counterclockwise direction about said core axis; said elongate rods having first and second ends attached respectively to said first and second end plates; each said rod being axially expandable to increase in length, responsive to and in dependence upon application of voltage of a first polarity applied between said rod ends, whereby one of said support plates rotationally moves through a circular arc relative to the other of said support plates.

2. The invention as defined in claim 1, further comprising:
   means for applying electrical current through said end plates to said rods, wherein expansion of said rods forces relative rotational movement between said support plates and twists said core, for transducing said electrical current to a mechanical angular movement of said first and second support plates.

3. The invention as defined in claim 1, further comprising:
   means for applying a torque between said first and second support plates to angularly rotate one of said first and second support plates relative to the other and twist said core for transducing said rotational movement to an electrical voltage appearing across said first and second support plates.

4. The invention as defined in claim 1, wherein
   said support plates each have a plurality of N peripheral locations on said peripheral portion, said plurality being equal in number to N, said plurality of peripheral locations being equally angularly spaced from one another about the perimeter of a circle centered on said core axis;
   said N peripheral locations of said first support plate being axially aligned with said N peripheral locations of said second support plate; whereby the first location on said first plate is aligned with the first location on the said second plate, said second location on said first plate is aligned with said second location on said second plate, and so on in order, through said Nth location on said first plate being aligned with said Nth location on said second plate;
   and wherein said first and second ends of each of said plurality of rods is connected in accordance with the following relationship:
   said first end of said nth rod is connected to said nth location on said first support plate and said second end of said nth rod connected to said (n+p)th location on said second support plate, where (n+p) is less than N, and to the ((n+p)−N)th location on said second support plate, where (n+p) is greater than N;
   where n is the number of said respective rod selected from the series of integers 1, 2, 3, ... N; and
   where p, representing the selected difference in positional spacing between the front and back ends of each respective rod, is an integer.

5. The invention as defined in claim 4, wherein p is the integer 1.

6. The invention as defined in claim 4, wherein p is the integer 2.

7. In a helicopter having a fuselage, a driven hub, a rotor, said rotor being periodically rotated by said hub through 360 degrees, said rotor comprising at least a pair of rotor blades, pilot control stick means carried in said fuselage for permitting control of the vertical lift and horizontal direction of travel the helicopter; and blade angle control means, responsive to said pilot control stick means, for controlling the pitch of said rotor blades as a function of azimuth during each revolution of said rotor blades; the improvement therein wherein said blade angle control means comprises:

electrically operated rotary actuator means coupled to each said blade for changing the blade pitch, said rotary actuator means being coupled mechanically to said respective blade for circular rotation by said hub jointly with said blade and said rotary actuator means comprising piezoelectric motor means.

8. The invention as defined in claim 7 further including:

resolver means for translating positional information on the mechanical position of said pilot control stick means into electronic information;

power control means carried in said fuselage for receiving electronic information from said resolver means and for outputting electronic positional information to said rotary actuator means; and electrical lead means for electrically coupling said power control means to said rotary actuator means.

9. The invention as defined in claim 7, wherein said blade means comprises: a main blade, said main blade including a leading edge and a trailing edge; a tab blade, said tab blade being pivotally mounted to said main blade at a distal location from said hub, with a portion of said tab blade extending outwardly from said trailing edge of said main blade, whereby said tab blade may be pivoted about an axis to change the angular orientation of said tab blade with respect to said main blade; and means mounting said electrically operated rotary actuator means to said main blade, said rotary actuator means being coupled to said tab blade for setting the pivotal position of said tab blade with respect to said main blade.

10. The invention as defined in claim 9, further comprising: blade root means for connecting said blade to said hub, said blade root means being torsionally flexible.

11. The invention as defined in claim 7, wherein said rotary actuator means comprises an elongate hollow cylinder of piezoelectric material; means fastening an end of said hollow cylinder proximal of said hub to said spar to anchor said cylinder; bearing means for rotationally mounting said proximal end of said hollow cylinder to a proximal end of said blade surface; second bearing means for rotational mounting said distal end of said hollow cylinder to the distal end of said spar; and means fastening an end of said hollow cylinder distal of said hub to said main blade surface, whereby rotary movement of said cylinder end angularly positions said main blade surface about said axis of said spar.

12. The invention as defined in claim 7, wherein said blade means comprises: a main blade, said main blade including a leading edge and a trailing edge; a floating tab blade, said floating tab blade being pivotally mounted to said main blade at a distal location from said hub, with a portion of said floating tab blade extending outwardly from said trailing edge of said main blade; a servo tab blade, said servo tab blade being pivotally mounted to said floating tab blade, with a portion of said servo tab blade extending outwardly from said floating tab blade, said servo tab blade including lever means for pivoting said servo tab, whereby said servo tab blade may be pivoted about an axis to change the angular orientation of said tab blade with respect to said main blade; and means mounting said electrically operated rotary actuator means to said main blade; lever means connected to said rotary actuator means, said rotary actuator means for angularly positioning said lever means; and linkage means for coupling said lever means to said servo tab blade lever means, whereby pivotal movement of the one lever means forces pivotal movement of the other lever means, and thereby the pivotal position of said servo tab blade.

13. The invention as defined in claim 7 wherein said piezoelectric motor means comprises:

a cylindrical shaped core, said core being torsionally flexible and longitudinally stiff, said core further defining an axis and having first and second ends;

first and second end support plates fixed to the respective ends of said core, each said end plate including a peripheral portion extending radially outward beyond the outer surface of said core;

a plurality of elongate rods of piezoelectric material, said rods being positioned about said core and arranged in parallel relationship to one another and skew to said core axis;

said elongate rods having first and second ends attached respectively to said first and second end plates; each said rod being axially expandable to increase in length, responsive to and in dependence upon application of voltage of a first polarity applied between said rod ends, whereby one of said support plates rotationally moves through a circular arc relative to the other of said support plates.

14. The invention as defined in claim 7, wherein said piezoelectric motor means further comprises:

a cylindrical shaped core, said core being torsionally flexible and longitudinally stiff, said core further defining an axis and having first and second ends;

first and second end support plates fixed to the respective ends of said core, each said end plate including a peripheral portion extending radially outward beyond the outer surface of said core;

a plurality of elongate rods of piezoelectric material, said plurality being equal to the integral number N, said rods being positioned about said core in non-intersecting relationship and skew to said core axis, with all of said rods being inclined at the same angle to said first support plate as measured in a counterclockwise direction about said core axis; said elongate rods having first and second ends attached respectively to said first and second end plates; each said rod being axially expandable to increase in length, responsive to and in dependence upon application of voltage of a first polarity applied between said rod ends, whereby one of said support plates rotationally moves through a circular arc relative to the other of said support plates.

15. In a powered aircraft, an electronic control system for controlling an airfoil of said aircraft for determining direction of the aircraft's travel, said control system including electro-optical means for conveying control signals to an actuator located at said airfoil, said actuator comprising a piezoelectric actuator for producing a torque on said airfoil; and wherein said piezoelectric actuator further comprises:

a cylindrical shaped core, said core being torsionally flexible and longitudinally stiff, said core further defining an axis and having first and second ends;

first and second end support plates fixed to the respective ends of said core, each said end plate including a peripheral portion extending radially outward beyond the outer surface of said core;

a plurality of elongate rods of piezoelectric material, said rods being positioned about said core in non-intersecting relationship and skew to said core axis;

said support plates each having a plurality of N peripheral locations on said peripheral portion, said plurality being equal in number to said plurality of rods, said plurality of peripheral locations being equally angularly spaced from one another about the perimeter of a circle centered on the axis of said support plate;

said N peripheral locations of said first support plate being axially aligned with said N peripheral locations of said second support plate; whereby the first location on said first plate is aligned with the first location on the said second plate, said second location on said first plate is aligned with said second location on said second plate, and so on in order, through said Nth location on said first plate being aligned with said Nth location on said second plate;

said elongate rods having first and second ends attached respectively to said first and second end plates connected in accordance with the following relationship:

said first end of said nth rod is connected to said nth location on said first support plate and said second end of said nth rod connected to said (n+p)th location on said second support plate, where (n+p) is less than N, and to the ((n+p)−N)th location on said second support plate, where (n+p) is greater than N;

where n is the number of said respective rod selected from the series of integers 1, 2, 3, . . . N; and where p, representing the selected difference in positional spacing between the front and back ends of each respective rod, is an integer;

each said rod being axially expandable to increase in length, responsive to and in dependence upon application of voltage of a first polarity applied between said rod ends, whereby one of said support plates rotationally moves through a circular arc relative to the other of said support plates.

\* \* \* \* \*